US005990025A

United States Patent [19]
Suyama et al.

[11] Patent Number: 5,990,025
[45] Date of Patent: Nov. 23, 1999

[54] CERAMIC MATRIX COMPOSITE AND METHOD OF MANUFACTURING THE SAME

[75] Inventors: Shoko Suyama, Yokohama; Tsuneji Kameda; Yasuhiro Goto, both of Tokyo; Masahiro Kato, Kanagawa-Ken, all of Japan

[73] Assignee: Kabushiki Kaisha Toshiba, Kawasaki, Japan

[21] Appl. No.: 08/827,501

[22] Filed: Mar. 28, 1997

[30] Foreign Application Priority Data

Mar. 29, 1996 [JP] Japan ................................. 8-077637
Sep. 27, 1996 [JP] Japan ................................. 8-256791

[51] Int. Cl.$^6$ .................................................. C04B 35/56
[52] U.S. Cl. ................................ 501/92; 428/570; 75/236
[58] Field of Search .......................... 501/92; 428/569, 428/570; 75/236

[56] References Cited

U.S. PATENT DOCUMENTS

| | | | |
|---|---|---|---|
| 3,419,404 | 12/1968 | Mao | 501/98.4 |
| 4,927,792 | 5/1990 | Petrovic et al. | 501/92 |
| 4,970,179 | 11/1990 | Petrovic et al. | 501/92 |
| 5,000,896 | 3/1991 | Petrovic et al. | 501/92 |
| 5,079,195 | 1/1992 | Chiang et al. | 501/92 |
| 5,281,565 | 1/1994 | Hecht et al. | 501/92 |
| 5,292,691 | 3/1994 | Hecht et al. | 501/96 |
| 5,292,692 | 3/1994 | Maloney et al. | 501/92 |
| 5,364,442 | 11/1994 | Sekhar | 75/229 |
| 5,364,513 | 11/1994 | Sekhar et al. | 204/244 |
| 5,454,999 | 10/1995 | Jayashankar et al. | 419/32 |
| 5,462,902 | 10/1995 | Henager, Jr. et al. | 501/87 |
| 5,514,630 | 5/1996 | Willkens et al. | 501/92 |

FOREIGN PATENT DOCUMENTS

| | | |
|---|---|---|
| 0 555 760 | 8/1993 | European Pat. Off. . |
| 0 643 023 | 3/1995 | European Pat. Off. . |
| 07215781 | 8/1995 | Japan . |
| 08048563 | 2/1996 | Japan . |

OTHER PUBLICATIONS

"Impression Creep Behavior of SIC Particle—MaSi$_2$ Composites" Butt et al Mater Sci Techn. Div. *J Mater Research* 11(6) pp. 1528–1536, 1996.

"Corrosion Behavior of Infiltrated Reaction Sintered Sicon Carbide" Kishan et al. J Mater. Sci Lett, 13(20) pp. 1516–1517, 1994.

"Mechanical Properties of MoSi$_2$ ISic/20w Net Shape Composite" Chen et al. Ceran Eng. Sci Proc (1996), 17 (3) pp. 287–294.

"Preliminary Study on Liquid Phase or Action Band of Sic by Using Si + Mo Liquid alloy" Hu et al. Guonayan Yuobao, 24 (3) pp. 347–351, 1996.

"Effects of Thermal Cycle on Mechanical Properties of SiC Particles Reinforced MoSi$_2$ Composite" Zheng et al. Acta Metall Sin (Engl Lett) 9(2) pp. 129–134, 1996.

"Mechanical Properties of MoSi$_2$ Matrix Sinuates Composites at Elevated Temperature" Jiang et al. Funtai Oyobi Funmatsu Yakin (1996) 43(4) pp. 444–449.

"Tensile Creep and Creep Rupture of SiC–Reinforced MoSi$_2$" French et al. Ceram Eng. Sci Proc. (1995) 16 (4), pp. 129–136.

"Microstructure and Properties of MoSi$_2$ & MoSi$_2$–SiC Sintered Bodies Obtained From Fire Powders" Hojo et al. Funtai Oyobi Funmatsu Vakin 42(11) 1295–9, 1995.

"The Effect of Grain Size and SiC Particulates on the Strength & Durctility of MoSi$_2$" Ghosh et al. Strength Mat: Fundam Phy Aspects Stength Const Mat. Proc Int'l Conference, 10$^{th}$ (1994) pp. 967–971.

"SiC Reinforced MoSi$_2$ Composite Materials" Wang et al, Int Symp Ceram. Materials. Compon. Engines., 5$^{th}$ (1995) Meeting Date 1994 pp. 304–307.

"Microstructure and Mechanical Properties of MoSi$_2$/SiC Composites" Suzuki et al. Ceram Trans. (1994), 44 (Mater. Processing & Design) pp. 427–434.

"Mechanical Properties of Molydan Disilude Based Mat'ls Consolidated by Hot Isostatic Press (HIC)" Suryanarayanan et al. Acta Metall Mater 42(11) pp. 3751–3757, 1994.

"Elevated–Temperature Mechanical Behavior of Plasma Sprayed MoSi$_2$–SiC" Wolfsteine et al., Mater. Sci Eng. A (1994) A 189(1–2) pp. 257–266.

"Field Assisted Combustion Synthesis of MoSi$_2$–SiC Composites" Gedevanoshvili et al. Ser. Matall Mater. (1994) 31 (6) pp. 741–743.

"Microstructure Evolution in Compositionaly Tailored MoSi$_2$–/SiC Composites" Riddle et al., Mater Res. Soc Symp Proc, 322 (High Temp Silver & Ref Alloys pp. 291–296 (1994).

"On the Fatigue Response of Bridging Ductile Fibers in a MoSi$_2$ Inter–Metallic Composite" Deve et al. Mater. Sci Eng. A (1993) a160(2) PP. 209–214.

"Strengthening of Discontinuously Reinforced MoSi$_2$ Composites at High Temperatures" Aiken, Mater. Sci Eng A (1992, A155(1–2) pp. 121–133.

"Synthesis & Properties of In Situ MoSi$_2$–/SiC Composites", Jayasharkar et al., Mater. Res. Soc. Symp Proc (1994) 322 (High Top Solids & Ref Alloys) pp. 33–40.

"Microstructures of XD Mohbchem Disilicade & Silium Carbide Particulates Components" Feng et al. Mater. Res. Soc Symp Proc. (1993), 288(High Temp. Ordered Intermetalic Alloys) pp. 1031–1036.

(List continued on next page.)

*Primary Examiner*—Paul Marcantoni
*Attorney, Agent, or Firm*—Finnegan, Henderson, Farabow, Garrett & Dunner, L.L.P.

[57] ABSTRACT

There is provided a ceramic matrix composite whose strength is less degraded even in a high-temperature range at, especially, 1,400° C. or higher, and a method of manufacturing the ceramic matrix composite. The ceramic matrix composite in which reinforcements are arranged in a ceramic matrix to be combined to the ceramic matrix is characterized in that the main component of the ceramic matrix consists of silicon carbide and molybdenum silicide based compound, the density ratio of the matrix is 90% or higher.

12 Claims, No Drawings

OTHER PUBLICATIONS

"Fabrication & Characterization of Reaction Bonded Silva carbide & Reaction Bromide SiC/MoSi$_2$" Yang et al. Int Symp. Ceram Mater. Compon, Engine. 5$^{th}$ (1995) Meeting Date (1994) pp. 252–259.

"Synthesis of SiC/MoSi$_2$ Composites Using Polyoric Pneurosis" Kim et al. Han'guk Chaelyo Hakhocchi (1996), 6(5), pp. 515–523, 1996.

"A New Rate for the Synthesis of SiC/MoSi$_2$ Composites Mat'ls" Narciso–Romero et al. Chen Comm (1996) (14) pp. 1667–1668.

"Preparation of SiC/MoSi$_2$ Composites by Sintering Process" Jin et al., Sintering Mater., Proc. Int. Symp. Sci Technol. Sinkey, 6$^{th}$ (1995) pp. 361–366.

"Properties of Heat–Treated Research Sintered Sicicon Carbide & Fabrication of Silicon Carbide/Molytodemure Sisiliude Composite" Iseki et al., Key Eng. Mat. 1991, 53–55 (Austerman '90) pp/ 138–143.

"High Strength MoSi$_2$ Matrix Composites" Ting et al., NASA Conf. Publ, 3225rpt. 1, 17$^{th}$ Conference on Metal Matrix, Carbon, 7 Ceramic Matrix Composite, pp. 21–36, (1994).

CERAMIC MATRIX COMPOSITE AND METHOD OF MANUFACTURING THE SAME

BACKGROUND OF THE INVENTION

1. Field of the Invention

The present invention relates to a ceramic matrix composite obtained by combining ceramic fibers with a silicon carbide (SiC) matrix and to a method of manufacturing the same and, more particularly, to a ceramic matrix composite having high strength even in a high-temperature range at, especially, 1,400° C. or higher and a method of manufacturing the same.

2. Description of the Related Art

In general, a ceramic sintered body has strength which is less degraded up to a high temperature, and is more excellent than a conventional metal material in hardness, electric insulating properties, abrasion resistance, heat resistance, corrosion resistance, light-weight properties, and the like. For this reason, the ceramic sintered body is popularly used in a large field as an electronic material or a structure material such as a heavy electric equipment part, an aircraft part, an automobile part, an electronic equipment, a precision instrument, or a semiconductor device material.

However, the ceramic sintered body is easily affected by tensile stress rather than compression stress, and, especially, the ceramic sintered body is broken by the tensile stress at once. That is, the ceramic sintered body disadvantageously has so-called high brittleness. For this reason, in order to make it possible to apply a ceramic part to a portion whose reliability should be high, high toughness of the ceramic sintered body or an increase in fracture energy are strongly demanded.

More specifically, a ceramic structure part used as a gas turbine part, an aircraft part, an automobile part, or the like requires high heat resistance, high refractory, and high reliability. In order to reply to this demand, studies for realizing the following ceramic composite material have advanced in domestic and foreign laboratories. That is, ceramic matrix composites (CMC) are improved on a toughness value or a fracture energy value in such a manner that reinforcements (strengthening materials) such as reinforcement fibers, whiskers, blades, and particles which consist of an inorganic material or a metal are dispersed in a matrix sintered body to be combined with each other.

Among the above ceramic matrix composites (CMC), a ceramic matrix composite using fibers as reinforcements is is excellent in fracture toughness or an increase in fracture energy, and has a great effect for improvement on reliability. As the reinforcement for the CMC, continuous fibers or short fibers such as glass fibers, carbon fibers, or ceramic fibers are mainly used.

Among the ceramic matrix composites which are reinforced or strengthened by fibers, a composite having silicon carbide (SiC) as a matrix is hopeful as a material constituting a structure member for high temperature because the composite has high heat resistance and high oxidation resistance.

Conventionally, as a method of combining reinforcements in the above ceramic matrix composite, the following method is employed. That is, a ceramic material powder is filled in a preform such as a fabric consisting of ceramic fibers by a wet method such as a slip cast method to manufacture a preliminary green body containing reinforcements. As in a conventional method of manufacturing a sintered body, the green body is sintered by atmospheric-pressure sintering, atmosphere pressing sintering, hot press, HIP, or the like.

On the other hand, when a matrix is formed by a reaction-sintering method, a material slurry containing carbon and SiC is impregnated in a preform such as a fabric consisting of ceramic fibers to form a preliminary green body, and reaction-sintering is performed while melted silicon (Si) is impregnated in the preliminary green body to cause the carbon component and melted Si to react with each other. A matrix consisting of a reaction-sintering SiC sintered body is integrally formed to manufacture a composite.

The reaction-sintering SiC sintered body manufactured as described above is rarely contracted during sintering, exhibits high dimensional precision, and has an advantage that a sintered body having a high density can be obtained under the heat condition at a relatively low sintering temperature of about 1,450° C. Furthermore, the reaction-sintering SiC can cope with a complex shape, and has the manufacturing cost which is considerably lower than that of another manufacturing process. For this reason, practical use of the reaction-sintering SiC as a matrix constituent material of a ceramic matrix composite is expected.

However, in a ceramic matrix composite using a reaction-sintering SiC as a matrix, a manufacturing process for impregnating melted Si is employed. For this reason, the reaction-sintering SiC contains 15 to 30% by volume of free Si, and the free Si disadvantageously degrades the high-temperature strength of the composite. More specifically, since the melting point of free Si is relatively low, i.e., 1,410° C., the structural strength of the composite is sharply degraded because of softening and melting of free Si under the high-temperature use condition at 1,400° C. or higher. Therefore, there is a severe problem that the reaction-sintering SiC cannot be used as a structure part material.

SUMMARY OF THE INVENTION

The present invention has been made to solve the above problems, has as its object to provide a ceramic matrix composite whose strength is less degraded even in a high-temperature at, especially, 1,400° C. or higher, and a method of manufacturing the ceramic matrix composite.

In order to achieve the above object, the present inventors employed, as a method of sintering a matrix, a reaction-sintering method which achieved a low sintering temperature, a small change caused by contraction during sintering, and preferable dimensional precision, and substituted part or almost of free Si left in the matrix for molybdenum silicide based compound such as molybdenum disilicate ($MoSi_2$). Namely, SiC matrix was formed by reaction-sintering method, simultaneously, $MoSi_2$ or the like was precipitated in the SiC matrix, thereby to reduce an amount of metal Si (free Si). As a result, the present inventors obtained a knowledge that a ceramic matrix composite which is excellent in high-temperature strength could be obtained.

That is, $MoSi_2$ has a high melting point of 2,030° C. and oxidation resistance which is equal to that of pure SiC sintered body, and exhibits excellent oxidation resistance up to a temperature of 1,600° C.

However, the polycrystalline of $MoSi_2$ is liable to pose a problem of causing a phenomenon, so-called "pest phenomenon" of the polycrystalline being powdered by oxidation at middle-temperature range of about 700–1000K. In addition, the brittleness of $MoSi_2$ is sharply degraded in a boundary temperature of about 1,000° C., and $MoSi_2$ has the quality of a ductile material. Therefore, $MoSi_2$ also pose a problem of degrading a high-temperature strength and creep strength.

The inventors of this invention have conducted various experiments in order to obtain a composite capable of improving the high-temperature strength and creep strength, and of suppressing the pest phenomenon, while utilizing the characteristics of $MoSi_2$. As the result, the following finding was obtained. Namely, when the matrix mainly composed of SiC, molybdenum silicide based compound and Si was formed, and this matrix was applied to a matrix for a continuous-fiber composite, there could be obtained a composite excellent in high-temperature strength.

In particular, when a compound having a general formula of Mo—Si—X, wherein X is at least one element selected from the group consisting of Al, Ta, Ti, Zr, Y, Re, W, V, Cr and Nb, was precipitated in the matrix, a significant effect of improving the high-temperature strength could be obtained.

In addition, the present inventors obtained the following knowledge. That is, when a composite surface was partially nitrified to form a surface layer which contained silicon nitride ($Si_3N_4$), was densely nitrified, and had a predetermined thickness, a composite material which was excellent in oxidation resistance could be obtained. When the method was applied to a gas turbine part, a ceramic matrix composite in which degradation of mechanical characteristics at a high temperature was less degraded with time could be obtained for the first time. The present invention is completed on the basis of the above knowledge.

More specifically, as defined in claim 1, the present invention provides a ceramic matrix composite in which reinforcements are arranged in a ceramic matrix to be combined with the ceramic matrix, characterized in that a main component of the ceramic matrix consists of silicon carbide and molybdenum silicide based compound, and a density ratio of the matrix is not less than 90%.

In another aspect, as defined in claim 2, the present invention provides a ceramic matrix composite in which reinforcements are arranged in a ceramic matrix to be combined with the ceramic matrix, characterized in that a main component of the ceramic matrix consists of silicon carbide, molybdenum silicide based compound, and free silicon, a density ratio of the matrix is not less than 98%, a content of free silicon in the matrix is not more than 10% by volume.

Further, the molybdenum silicide based compound may preferably be molybdenum disilicide ($MoSi_2$). Furthermore, the molybdenum silicide based compound may preferably have a general formula of Mo—Si—X wherein X is at least one element selected from the group consisting of Al, Ta, Ti, Zr, Y, Re, W, V, Cr and Nb.

In the ceramic matrix composites as defined in claims 1 and 2, a surface layer containing silicon carbide, molybdenum silicide based compound, and silicon nitride as a main component or a nitrified surface layer containing silicon nitride is preferably formed on a surface of the ceramic matrix composite. The thickness of the surface layer is preferably not less than 10 $\mu$m, and is preferably not more than 5% of the thickness of the ceramic matrix composite. The average grain size of silicon nitride contained in the surface layer is preferably not more than 10 $\mu$m.

The ceramic matrix composite is characterized in that the reinforcements consist of ceramic continuous fibers.

The ceramic matrix composite is characterized in that an average grain size of silicon carbide constituting the matrix is not more than 20 $\mu$m, and an average grain size of molybdenum silicide based compound such as molybdenum disilicate is not more than 10 $\mu$m.

The ceramic matrix composite is characterized in that the matrix has a structure obtained by uniformly dispersing molybdenum silicide based compound in silicon carbide.

The ceramic-based fiber composite material is characterized in that the matrix has a structure obtained by uniformly dispersing clusters consisting of molybdenum silicide based compound in silicon carbide, and the diameter of each cluster is not more than 200 $\mu$m.

The ceramic matrix composite is characterized in that, when an arbitrary section of the matrix is observed, the matrix has a micro-structure obtained by dispersing fine particles consisting of silicon carbide in a molybdenum silicide based compound phase. In addition, the fine particles consisting of silicon carbide and dispersed in the molybdenum silicide based compound phase are preferably nano-sized particles.

Such a fine structure (micro-structure) is formed by dispersing and precipitating a part or all of fine particles of silicon carbide sintered body generated by reaction-sintering in a molybdenum silicide based compound phase. In this case, as a start material of at least a part of carbon constituting the green body consisting of reinforcement, silicon carbide, and carbon, a carbon powder having a grain particle size of not more than 1 $\mu$m is preferably used. The fine structure may be formed by dispersing and precipitating a part or all of fine particles of silicon carbide sintered body generated by reaction-sintering in a molybdenum silicide based compound phase. In this case, as a start material of at least a part of carbon constituting the green body consisting of reinforcements, silicon carbide, and carbon, a carbon powder having a grain particle size of not more than 100 nm is preferably used.

The ceramic matrix composite having the above fine structure exhibits excellent high-temperature characteristics because the molybdenum silicide based compound phase exhibiting ductility in a high-temperature range at 1,000° C. or higher improves the strength of the composite and considerably improves creep characteristics.

According to the present invention, a method of manufacturing a ceramic matrix composite is characterized by comprising the step of preparing a green body consisting of reinforcements, silicon carbide, and carbon, the step of performing reaction-sintering while an alloy consisting of silicon and molybdenum is impregnated in the green body, the step of causing a carbon component and impregnated silicon to react to form a silicon carbide sintered body serving as a matrix, and the step of causing impregnated silicon and molybdenum to react to precipitate molybdenum silicide based compound such as molybdenum silicate in the matrix.

In order to obtain the matrix containing molybdenum silicide based compound, molten (a) Si—Mo—X alloy, (b) Si—Mo alloy, (c) Si—X alloy, (d) Si are impregnated into (1) green body consisting of C and SiC,
   (2) green body consisting of C, SiC and X,
   (3) green body consisting of C, SiC and Mo,
   (4) green body consisting of C, SiC, Mo and X, thereby
     to precipitate molybdenum silicide based compound having aimed composition in the matrix.

In the matrix containing such molybdenum silicide based compound, there cannot be observed a degradation of mechanical properties even in a high-temperature range at 1,400° C. or higher. Further, since the molybdenum silicide based compound is precipitated in the matrix, a transition temperature at which the matrix is changed from brittle material to ductile material is increased, thereby to enable to enhance high-temperature strength and to improve creep characteristics. In addition, aforementioned "pest phenomenon" can be effectively suppressed, and a composite excellent in high-temperature strength can be obtained.

In this case, when reaction-sintering is performed while an alloy consisting of silicon and molybdenum or the like is impregnated in the green body by a method of preparing the matrix, an alloy whose composition is controlled to a predetermined composition is preferably impregnated through all the impregnation steps.

The above manufacturing method may further comprise the step of heating the ceramic matrix composite formed by reaction-sintering at a temperature of 1,500° C. to 1,700° C. in a reduced-pressure atmosphere to remove free silicon.

The above manufacturing method may further comprise the step of heating the ceramic matrix composite formed by reaction-sintering at a temperature of 1,300° C. to 1,400° C. in a nitrogen-pressed atmosphere to nitrify free silicon in a material surface, thereby forming a nitride surface layer containing silicon nitride on the material surface.

In the above manufacturing method may further comprise the step of heating the ceramic matrix composite in which a matrix is formed by reaction-sintering at a temperature of 1,300 to 1,400° C. in a nitrogen-pressed atmosphere to ooze silicon from internal of the material to a material surface portion, and the step of nitrifying the oozed silicon on the material surface portion to form a nitride surface layer containing silicon nitride on the material surface.

In this case, when reaction-sintering is performed while an alloy consisting of silicon and molybdenum or the like is impregnated in the green body by a method of preparing the matrix, an alloy having a predetermined composition is preferably impregnated by using a switching operation for atmospheres in a sintering furnace.

A temperature raising process is performed in an inert gas atmosphere in the reaction-sintering step of the manufacturing method, the inert gas atmosphere is switched to a vacuum when the temperature reaches a predetermined sintering temperature to progress sintering, and the cooling step is preferably performed in an inert gas atmosphere.

In this case, when reaction-sintering is performed while an alloy consisting of silicon and molybdenum or the like is impregnated in the green body by a method of preparing the matrix, an alloy whose content is substantially equal to the content of the alloy consumed by the green body in the reaction-sintering is preferably impregnated to prevent the alloy from being excessively supplied. More specifically, in the reaction-sintering step, the content of the alloy consisting of silicon and molybdenum impregnated in the green body is preferably set to be 1.2 times the alloy content required for the reaction-sintering for the green body.

In this case, various ceramic continuous fibers are preferably used as reinforcements to be arranged in the ceramic matrix. A predetermined content of the ceramic continuous fibers is mixed with the ceramic matrix to improve the toughness of the reaction-sintering SiC matrix. As the ceramic fibers, various fibers such as long fibers, short fibers, or whisker having various shapes are used. The material of the ceramic fibers is not limited to a specific one, and a ceramic material similar to the material constituting the matrix can also be used.

As an example of the ceramic fibers, at least one type selected from fiber-like materials such as silicon-carbide-based fibers (SiC, Si—C—O, Si—Ti—C—O, or the like), SiC-coated fibers (core fiber consisting of, e.g., C), alumina ($Al_2O_3$) fibers, zirconia ($ZrO_2$) fibers, carbon (C) fibers, boron (B) fibers, silicon nitride ($Si_3N_4$)-based fibers, $Si_3N_4$-coated fibers (core fiber consisting of, e.g., C), mullite fibers, SiC whisker, $Si_3N_4$ whisker, $Al_2O_3$ whisker, and $ZrO_2$ whisker is preferably used.

These ceramic continuous fibers are preferably added at a fiber volume fraction (Vf) of 10% or more with respect to the entire volume of the composite. However, when the content of fibers exceeds 50%, it is difficult to uniformly arrange matrices around each fiber, and the strength characteristics of the composite may be sharply degraded with occurrence of defects. Therefore, a preferable content at which a composite effect is obtained ranges from 10 to 50% by volume, more preferably, from 15 to 40% by volume.

The molybdenum silicide based compounds such as molybdenum disilicide ($MoSi_2$) are precipitated such that the composition of an alloy consisting of an Mo component and an Si component which are impregnated changes the moment the SiC sintered body is formed by reaction-sintering. The molybdenum silicide based compound is formed to be uniformly dispersed and precipitated in a matrix consisting of an SiC sintered body.

$MoSi_2$ has a high melting point of 2,030° C. and oxidation resistance which is equal to that of pure SiC sintered body, and exhibits excellent oxidation resistance up to a temperature of 1,600° C. However, the brittleness of $MoSi_2$ is sharply degraded in a boundary temperature of about 1,000° C., and $MoSi_2$ has the quality of a ductile material.

The average diameter of the molybdenum silicide based compound such as $MoSi_2$-precipitated body is preferably set to be 10 μm or less to keep the high-temperature strength of the entire composite high. As the distribution state of molybdenum silicide based compound, a state wherein fine compound such as $MoSi_2$ is uniformly dispersed and precipitated in SiC may be used, but a state wherein coarse clusters formed by aggregating a plurality of compound-precipitated bodies and each having a diameter of 200 μm or less are uniformly dispersed in SiC.

In a composite in which fine compound precipitated bodies are uniformly dispersed and precipitated in SiC, since apparent Young's modulus decreases in a high-temperature range at 1,000° C. or higher, a strengthening mechanism obtained by reinforcements such as ceramic continuous fibers can be sufficiently expected.

On the other hand, in a composite in which coarse clusters formed by aggregating compound-precipitated bodies are uniformly dispersed in SiC, although a decrease in strength in a high-temperature range at 1,000° C. or higher is smaller than that in the composite in which fine compound precipitated bodies are uniformly dispersed, non-elastic deformation easily occur. Therefore, it is important that the distribution state of compound such as $MoSi_2$ is correctly controlled according to application conditions for respective parts.

The distribution state of the molybdenum silicide based compound such as $MoSi_2$ can be adjusted by changing processing conditions such as a sintering holding time and a cooling rate during reaction-sintering.

The average grain size of SiC serving as a main component constituting the matrix is set to be 20 μm or less to assure preferable high-temperature strength of the composite.

The content of free Si constituting the matrix is set to be 10% by volume or less. If the content of free Si exceeds 10% by volume, Si is softened and melted at a high temperature of 1,400° C. or higher to sharply degrade the high-temperature strength of the composite. For this reason, the content of free Si in the matrix is preferably set to be 10% by weight or less, more preferably, 5% by weight or less.

In the ceramic matrix composites as defined in claims 2 and 1, the density ratios of the matrices are set to be 98% or more and 90% or more, respectively. The ceramic matrix composite as defined in claim 1 is manufacturing such that the ceramic matrix composite as defined in claim 2 is heated to 1,500° C. to 1,700° C. in a reduced-pressure atmosphere to remove free Si. Therefore, the density ratio of the ceramic matrix composite as defined in claim 1 becomes lower than the density ratio of the composite as defined in claim 2 by a value corresponding to the content of free Si. As a result, the density ratio of the ceramic matrix composite defined in claim 1 is 90% or more.

The surface layer formed on the surface of the ceramic matrix composite densifies the material surface and effectively suppresses an oxidizing gas and a corrosive gas contained in the atmosphere in use from being permeated into the material. The surface layer is effective to improve the oxidation resistance and corrosion resistance of the composite. Therefore, as a material constituting parts such as a gas turbine part used at a high-temperature in an oxidation gas atmosphere, the ceramic matrix composite having a surface layer formed thereon is preferably used.

The surface layer is formed such that a ceramic matrix composite formed by reaction-sintering is heated to 1,300 to 1,400° C. in a nitrogen-pressed atmosphere or a nitrogen atmosphere to nitrify free Si in the surface portion of composite.

When the thickness of the surface layer is smaller than 10 $\mu$m, improvement of oxidation resistance of the composite is not sufficient. For this reason, the thickness of the surface layer is set to be 10 $\mu$m or more. However, when the thickness of the surface layer exceeds 5% of the thickness of the composite, the characteristics inherent in SiC serving as a matrix are degraded. Therefore, the thickness of the surface layer is set to be 5% or less of the thickness of the composite.

The average grain size of $Si_3N_4$ contained in the surface layer is set to be 10 $\mu$m or less to assure preferable high-temperature strength of the composite.

In the method of manufacturing a ceramic matrix composite according to the present invention, when the reaction-sintering is progressed while an alloy consisting of Si and Mo is melted and impregnated in a preliminary green body, the impregnation of the Si—Mo alloy having a predetermined composition is very important to control the matrix composition of a reaction-sintering SiC—$MoSi_2$—based composite.

However, in a temperature raising process performed until a reaction system is heated to have a predetermined sintering temperature, and in a temperature lowering process for cooling the sintered body upon completion of sintering, the composition of an Si-Mo alloy impregnated in a temperature range from the sintering temperature and the eutectic temperature of Si—Mo is different from a predetermined Si—Mo alloy composition. For this reason, the matrix composition cannot be controlled.

However, according to knowledge obtained by the present inventors, the molten Si—Mo alloy is brought into contact with a preliminary green body at only a predetermined temperature at which reaction-sintering is performed. On the other hand, in the temperature raising process and the temperature lowering process, it was found that a ceramic matrix composite having a predetermine composition could be obtained by making a countermeasure for preventing the preliminary green body from being in contact with the melted Si—Mo alloy.

It was found that an operation for switching an atmosphere in the sintering furnace or an operation for exactly controlling the Si—Mo alloy are effective as the countermeasure for bringing the preliminary green body into contact with the molten Si—Mo alloy at the predetermined temperature at which the reaction-sintering is performed and preventing the preliminary green body and the Si—Mo alloy from being in contact with each other in the temperature raising process and the temperature lowering process.

The operation for switching the atmosphere in the sintering furnace uses a fact that temperature ranges in which Si and an Si—Mo alloy are melted and flow in an inert gas atmosphere and a reduced-pressure atmosphere are different from each other. More specifically, a temperature range in which Si and an Si—Mo alloy are melted and flow is higher in the inert gas atmosphere than in a vacuum atmosphere.

For this reason, the inert gas atmosphere is switched to the vacuum state when the temperature reaches a predetermined sintering temperature, and the inert gas atmosphere is preferably set again in the cooling process. With the switching operation for the sintering atmosphere, the Si—Mo alloy having compositions different in the temperature raising process and the cooling process can be prevented from being impregnated in the preliminary green body. Therefore, a reaction-sintering SiC—$MoSi_2$—based composite whose matrix composition is controlled at high precision can be obtained.

On the other hand, the method of controlling the content of Si—Mo metal mixture impregnated in the preliminary green body is a method of causing only a content of the Si—Mo alloy having a predetermined composition and required for performing complete reaction-sintering with the preliminary green body to react with the preliminary green body. In this manner, the preliminary green body and an excessive amount of Si—Mo alloy can be prevented from reacting with each other during sintering and in the temperature lowering process. Since these methods are especially simple and reliable methods of the methods of impregnating Si—Mo alloy having a predetermined composition, these methods are very useful to control the composition of a composite.

According to the ceramic matrix composite having the above arrangement and a method of the manufacturing the same, since a part or all of free Si contained in a matrix is substituted for molybdenum silicide based compound such as molybdenum disilicide ($MoSi_2$), a ceramic matrix composite which is excellent in strength at a high temperature of 1,400° C. or higher can be obtained.

When a dense surface layer containing silicon nitride ($Si_3N_4$) is formed on the surface of the ceramic matrix composite, even if the ceramic matrix composite is used in a corrosive environment, there can be obtained a ceramic matrix composite in which a corrosive gas or an oxidizing gas rarely impregnated and which has excellent oxidation resistance.

DESCRIPTION OF THE PREFERRED EMBODIMENT

An embodiment of the present invention will be described below with reference to the following Examples.

EXAMPLE 1

SiC continuous fibers (trade name: Hi-nicalon available from Nippon Carbon Co., Ltd.) having a boron nitride (BN) coating having a thickness of 0.4 $\mu$m and formed thereon and each having a diameter of 14 $\mu$m were prepared, the SiC continuous fibers were woven to fabricate a plain weave cloth.

On the other hand, an SiC powder (average grain size: 5 $\mu$m) serving as an aggregate and a carbon powder (average grain size: 1 $\mu$m) whose content corresponds to 20% by weight of the content of SiC powder were dispersed in an aqueous solvent to prepare a low-viscosity material slurry.

A plurality of plain weave clothes fabricated as described above were stacked on each other while being impregnated in the material slurry to fabricate a preform (preliminary green body). The preform was fabricated such that the fiber volume fraction (Vf) in the composite material was set to be 25% as shown in Table 1.

On the other hand, an alloy consisting of Si and Mo to be impregnated during reaction-sintering was prepared as a metal mixture obtained such that 10 mol % of Mo powder with respect to an Si powder content was mixed with an Si powder by a wet method.

The fabricated preliminary green body was set in a porous mold, pressure-casted by the material slurry, and then dried. Thereafter, the preliminary green body was heated to a temperature of 1,450 to 1,600° C., and reaction-sintering was performed while an Si—Mo alloy formed by melting the metal mixture was impregnated in the green body, thereby preparing a ceramic matrix composite according to Example 1.

The matrix of the ceramic matrix composite according to Example 1 was observed with a scanning electron microscope (SEM) with respect to a fine structure. As a result, the matrix consisted of SiC, $MoSi_2$, and free Si, had a fine structure in which $MoSi_2$-precipitated bodies having an average grain size of 5 μm or less were uniformly precipitated in the entire matrix sintered body, a density ratio of the matrix (ratio of an actual density to a theoretical density) was 99%, and a content of free Si was 10 vol. % or less.

EXAMPLE 2

A ceramic matrix composite prepared in Example 1 was heated to a temperature of 1,600° C. or higher in a reduced-pressure atmosphere to remove free Si contained in the composite, thereby preparing a ceramic matrix composite according to Example 2.

The matrix of the composite according to Example 2 consisted of SiC and $MoSi_2$, and had a density ratio of 90% or more.

EXAMPLE 3

A ceramic matrix composite prepared in Example 1 was heated a temperature of 1,300 to 1,400° C. in a nitrogen-pressed atmosphere to nitrify free Si on the surface of the composite material and near the surface and to form a surface layer containing silicon nitride ($Si_3N_4$), thereby preparing a ceramic matrix composite according to Example 3.

The internal structure of the matrix of the composite according to Example 3 consisted of SiC, $MoSi_2$, and free Si, and a surface layer having a composition of SiC/$MoSi_2$/$Si_3N_4$ was formed on the surface and near the surface of the composite.

EXAMPLE 4

A ceramic matrix composite prepared in Example 1 was heated to a temperature of 1,300 to 1,400° C. in a nitrogen atmosphere to ooze free Si left in the composite to the surface portion of the composite, and the oozed free Si on the surface portion was nitrified to form a surface layer containing silicon nitride ($Si_3N_4$), thereby preparing a ceramic matrix composite according to Example 4.

The internal structure of the matrix of the composite according to Example 4 consisted of SiC and $MoSi_2$, and a surface layer having a composition of SiC/$MoSi_2$/$Si_3N_4$ was formed on the surface and near the surface of the composite.

Comparative Example 1

In the manufacturing process in Example 1, a ceramic matrix composite according to Comparative Example 1 serving as a conventional reaction-sintering matrix-based composite was prepared in the same process as in Example 1 except that only an Si component was impregnated without melting and impregnating an Si—Mo alloy during reaction-sintering.

Bending test pieces each having a width of 7 to 10 mm, a thickness of 1 to 3 mm, and a length of 40 mm were cut from the prepared ceramic matrix composites according to Examples and Comparative Example. A three-point bending strength test at room temperature and 1,600° C. was performed to the test pieces to measure an initial matrix cracking strength $\sigma f (F)$ and a maximum strength $\sigma f (U)$ of each test piece.

An X-ray diffraction test was performed to each composite. On the basis of the peak strength ratio obtained by the X-ray diffraction test, the composition ratio of the matrix was calculated. An oxidation test was performed to the composite samples such that the samples were heated to 1,300° C. in the air and kept for 200 hours in this state. Weight increase rates of the samples before and after the oxidation test were measured to evaluate the oxidation resistances of the samples. The measurement results are shown in Table 1 described below. The weight increase rate of each sample before and after the oxidation test is relatively expressed on the assumption that the weight increase rate of the sample according to Comparative Example 1 was set to be a reference value of 1.

TABLE 1

| Sample No. | Reinforcements | | Matrix of Composite (vol. %) | | | Thickness of Surface Layer Containing $Si_3N_4$ (μm) | Density Ratio of Matrix (%) |
|---|---|---|---|---|---|---|---|
| | Specification | Volume Fraction Vf (%) | SiC | $MoSi_2$ | Free Si | | |
| Example 1 | BN-coated SiC continuous fiber (Hi-Nicalon) | 25 | 79 | 13 | 8 | — | 99 |
| Example 2 | BN-coated SiC continuous fiber (Hi-Nicalon) | 25 | 80 | 12 | — | — | 92 |
| Example 3 | BN-coated SiC continuous fiber (Hi-Nicalon) | 25 | 80 | 12 | 8 | 20 | 99 |

TABLE 1-continued

| | | | | | | | |
|---|---|---|---|---|---|---|---|
| Example 4 | BN-coated SiC continuous fiber (Hi-Nicalon) | 25 | 79 | 13 | — | 20 | 92 |
| Comparative Example 1 | BN-coated SiC continuous fiber (Hi-Nicalon) | 25 | 81 | — | 19 | — | 88 |

| | Three-Point Bending Strength (MPa) | | | | Oxidation Resistance |
|---|---|---|---|---|---|
| | Room Temperature (RT) | | (1600° C.) | | |
| | Initial Matrix Cracking Strength of (F) | Maximum Strength of (U) | Initial Matrix Cracking Strength of (F) | Maximum Strength of (U) | Weight Increase Rate of Sample After Oxidation Test |
| Example 1 | 200 | 320 | 180 | 300 | 0.5 |
| Example 2 | 170 | 330 | 170 | 320 | 0.5 |
| Example 3 | 220 | 350 | 250 | 340 | 0.5 |
| Example 4 | 180 | 290 | 240 | 370 | 0.5 |
| Comparative Example 1 | 250 | 420 | 50 | 75 | 1 (reference value) |

As is apparent from the results shown in Table 1, although the initial matrix cracking strengths (F) of the composites in Examples at room temperature were lower than the initial matrix cracking strength of the conventional composite of Comparative Example 1, the initial matrix cracking strengths and the maximum strengths σ f (U) of the composites of Examples at a high temperature of 1,600° C. were 3 to 5 times those of the composite of Comparative Example 1. Therefore, it was found that the composites of Examples exhibited excellent high-temperature strengths.

In particular, when the density ratio of the matrix was 98% or more, and a free Si content was 10% or less, degradation of mechanical characteristics in a high-temperature range was small. In contrast to this, when the density ratio was lower than 98%, and the free Si content exceeded 10 vol. %, it was confirmed that mechanical characteristics in the high-temperature range were sharply degraded.

In addition, the following was found. That is, when the composite was nitrified to form a dense surface layer having a predetermined thickness, the oxidation resistance of the composite was improved, and mechanical characteristics in the high-temperature range could be more improved.

Influences of the average grain size of SiC particles constituting the matrix, the average diameter of $MoSi_2$-precipitated phases, a dispersion state, and the like to the high-temperature strength of a composite will be described below with reference to the following Examples.

EXAMPLES 5–8

By using the preliminary green bodies, the material slurry, and the metal mixture (alloy) which were prepared in Example 1, reaction-sintering was performed to prepare ceramic matrix composites according to Examples 5 to 8. More specifically, BN-coated Hi-nicalon continuous (long) fibers were woven into clothes, these clothes were stacked on each other while being impregnated in the material slurry, thereby forming preliminary green bodies.

The preliminary green bodies were set in porous molds, pressure-casted by the material slurry, and then dried. Thereafter, the preliminary green bodies were heated to a temperature of 1,450 to 1,600° C., and reaction-sintering was performed while an alloy consisting of Si and Mo was melted and impregnated in the green bodies, thereby preparing ceramic matrix composites according to Examples 5 to 8.

The ceramic matrix composites according to Examples 7 and 8 were further heated to a temperature of 1,300 to 1,400° C. in a nitrogen atmosphere, and free Si oozed from the surfaces and portions near the surfaces was nitrified to form surface layers each having a thickness of 20 μm.

In the matrices of the composites in Examples 5 and 7, fine structures in which fine $MoSi_2$-precipitated phases were uniformly dispersed in the SiC sintered bodies were obtained. On the other hand, in the composites of Examples 6 and 8, the structures in which coarse clusters (aggregates) each obtained by connecting $MoSi_2$-precipitated bodies to each other in the form of a net were uniformly dispersed in SiC.

On the surfaces of the composites of Examples 7 and 8, dense surface layers each having a composition of $SiC/MoSi_2/Si_3N_4$ were formed. The matrix of the composite of Comparative Example 2 consisted of only two phases of SiC and free Si, and $MoSi_2$ particles were not precipitated.

Comparative Examples 2, 3, and 4

In the manufacturing process in Example 5, a ceramic matrix composite according to Comparative Example 2 was prepared in the same process as in Example 5 except that only Si was impregnated at about 1,450° C. without melting and impregnating an Si—Mo alloy during reaction-sintering.

A ceramic matrix composite according to Comparative Example 3 in which the average grain size of SiC was large, i.e., 30 μm, and the average grain size of $MoSi_2$ was large, i.e., 15 μm was prepared.

A ceramic matrix composite according to Comparative Example 4 in which the average grain size of SiC was large, i.e., 30 μm, the average grain size of $MoSi_2$ was large, i.e., 15 μm, and a surface layer having a thickness of 20 μm and $Si_3N_4$ precipitated therefrom was formed was prepared.

Bending test pieces each having a width of 7 to 10 mm, a thickness of 1 to 3 mm, and a length of 40 mm were cut from the prepared ceramic matrix composites according to Examples and Comparative Example. A three-point bending strength test at room temperature and 1,600° C. was performed to the test pieces to measure an initial matrix cracking strength σ f (F) and a maximum strength σ f (U) of each test piece.

The polished surfaces of the composites were observed with a scanning electron microscope (SEM-BEI) to measure the diameters of SiC particles, $MoSi_2$-precipitated bodies, clusters (aggregates) of $MoSi_2$ and the average grain size of $Si_3N_4$ contained in the surface layer. The measurement results are shown in Table 2.

EXAMPLE 9–10 AND COMPARITIVE EXAMPLES 5–7

In the reaction-sintering step for the ceramic matrix composite according to Example 1, ceramic matrix composites according to Examples 9 to 10 and Comparative Example 5 to 7 were prepared in the same process as in Example 1 except that an atmosphere in which a reaction system containing a green body and an Si—Mo alloy was heated to increase the temperature to a sintering temperature of 1,450 to 1600° C., an atmosphere set from time when the temperature reached the sintering temperature to time when

TABLE 2

| | Fine Structure of Matrix | | | Average Grain Size of Silicon Nitride Contained in Surface Layer ($\mu m$) | Three-Point Bending Strength (MPa) | | | |
|---|---|---|---|---|---|---|---|---|
| | | | | | Room Temperature (RT) | | 1600° C. | |
| Sample No. | Average Grain Size of SiC ($\mu m$) | $MoSi_2$ ($\mu m$) | | | Initial Matrix Cracking Strength of (F) | Maximum Strength of (U) | Initial Matrix Cracking Strength of (F) | Maximum Strength of (U) |
| | | Average Grain Size | Cluster Diameter | | | | | |
| Example 5 | 5 | 5 | — | — | 200 | 320 | 180 | 300 |
| Example 6 | 5 | 5 | 100 | — | 180 | 300 | 220 | 340 |
| Example 7 | 5 | 5 | — | 5 | 220 | 350 | 250 | 340 |
| Example 8 | 5 | 5 | 100 | 5 | 200 | 330 | 270 | 380 |
| Comparative Example 2 | 5 | — | — | — | 250 | 420 | 50 | 75 |
| Comparative Example 3 | 30 | 15 | — | — | 80 | 250 | 100 | 200 |
| Comparative Example 4 | 30 | 15 | — | 15 | 120 | 260 | 110 | 220 |

As is apparent from Table 2, even if the compositions of SiC and $MoSi_2$ constituting the matrixes were almost equal to each other, the initial matrix cracking strengths and maximum strengths of the composites were considerably dependent on the difference between the average grain sizes of the constituent particles and the difference between the fine structures such as distribution states. In particular, it was found that the finer the average grain sizes of the SiC particles and $MoSi_2$-precipitated phases were made, the higher a high-temperature strength became.

In the temperature raising process, the sintering process, and the cooling process in the reaction-sintering step, influences suffered when operation atmospheres are switched to each other will be described below with reference to the following Examples and Comparative Examples.

the sintering was completed, and an atmosphere set from time the sintering was completed to time when the cooling process was started were switched to each other ds shown in Table 3.

The X-ray diffraction strength values of the composites prepared as described above were measured, and the composition ratios of the matrixes were calculated on the basis of resultant analytical curves. The presence/absence of occurrence of Si lines (state wherein a crack was buried with Si) in the matrixes and the appearances of the matrixes were examined to obtain results shown in Table 3. A ratio of the contents of an actually impregnated alloy to the theoretical content of an Si—Mo alloy consumed by each green body in reaction-sintering was measured. The resultant values are shown in Table 3.

TABLE 3

| | Atmosphere during Sintering | | | | Matrix Composition of Composite | | | |
|---|---|---|---|---|---|---|---|---|
| | Temperature | | | Ratio of Si—Mo | (% by volume) | | | |
| Sample No. | Raising Process | Sintering Process | Cooling Process | Alloy Content | SiC | $MoSi_2$ | Si | Appearance of Matrix |
| Example 9 | Ar | reduced-pressure | Ar | 1.1(excessive) | 80 | 12 | 8 | No Si line was detected. |
| Example 10 | Ar | reduced-pressure | reduced-pressure | 1.0(theoretical value) | 79 | 13 | 8 | No Si line was detected. |
| Comparative Example 5 | reduced-pressure | reduced-pressure | reduced-pressure | 1.5(excessive) | 79 | 5 | 16 | Si line was observed. |
| Comparative Example 6 | reduced-pressure | reduced-pressure | Ar | 1.5(excessive) | 80 | 7 | 13 | Si line was observed. |
| Comparative Example 7 | Ar | reduced-pressure | reduced-pressure | 1.5(excessive) | 79 | 7 | 14 | No Si line was detected. |

As is apparent from the results shown in Table 3, in the composites of Examples 9 to 10 prepared such that the temperature raising process was performed in an inert gas atmosphere, and the sintering process was performed in a vacuum state, an Si—Mo alloy having a predetermined composition was impregnated. For this reason, ceramic matrix composites each containing less free Si could be obtained. On the other hand, in the composites of Comparative Examples 5 to 6 in which the temperature raising process to the sintering process were performed in a reduced-pressure atmosphere, Si lines obtained by filling Si in cracks were observed.

Influences suffered when the types of carbon sources or the grain sizes of material powders are changed will be described below with reference to the following Examples and Comparative Example.

EXAMPLE 11

An SiC powder (average grain size: 5 μm) serving as an aggregate and a carbon powder (average grain size: 1 μm) whose content corresponds to 20% by weight of the content of SiC powder were dispersed in an aqueous solvent to prepare a low-viscosity material slurry.

A plurality of plain weave clothes fabricated such that BN-coated Hi-nicalon fibers were woven as Example 1 were stacked on each other while being impregnated in the material slurry to fabricate a preform (preliminary green body).

On the other hand, an alloy consisting of Si and Mo to be impregnated during reaction-sintering was prepared as a metal mixture obtained such that 10 mol % of Mo powder with respect to an Si powder content was mixed with an Si powder by a wet method.

The fabricated preliminary green body was set in a porous mold, pressure-casted by the material slurry, and then dried. Thereafter, the preliminary green body was heated to a temperature of 1,600° C., and reaction-sintering was performed while an Si—Mo alloy formed by melting the metal mixture was impregnated in the green body, thereby preparing a ceramic matrix composite according to Example 11.

EXAMPLE 12

Preform formation, impregnation of an Si—Mo alloy, and reaction-sintering were performed under the same conditions as in Example 11 except that a material slurry prepared by dispersing an SiC powder having an average grain size of 1 μm and super-fine carbon powder having an average grain size of 0.01 μm in an aqueous solvent was used, thereby preparing a ceramic matrix composite according to Example 12.

Comparative Example 8

An SiC powder having an average grain size of 5 μm and a fran resin were dispersed in a solvent and mixed with each other to prepare a material slurry. A plurality of plain weave clothes fabricated such that BN-coated Hi-nicalon fibers were woven as Example 1 were stacked on each other while being impregnated in the material slurry to fabricate a preform.

The resultant preform was subjected to a heat treatment to carbonize the fran resin component. Thereafter, the preform was heated to a temperature of 1,600° C. in a vacuum state, and reaction-sintering was performed while an Si—Mo alloy was melted and impregnated in the green body, thereby preparing a ceramic matrix composite according to Comparative Example 8.

Bending test pieces were cut from the prepared ceramic matrix composites according to Examples and Comparative Example. A three-point bending strength test at room temperature (RT: 25° C.) and 1,600° C. was performed to the test pieces to measure an initial matrix cracking strength and a maximum strength of each test piece.

The test pieces were kept at 1,350° C., and a creep test for measuring a rate of strain obtained when a load of 100 MPa acted on the test pieces was performed to evaluate the high-temperature characteristics of the composites. The measurement results are shown in Table 4.

TABLE 4

| | Three-Point Bending Strength σ (MPa) | | | | High-Temperature |
|---|---|---|---|---|---|
| | Room Temperature (RT) | | 1600τ | | Creep Test |
| Sample No. | Initial Matrix Cracking Strength of (F.) | Maximum Strength of (U) | Initial Matrix Cracking Strength of (F.) | Maximum Strength of (U) | Rate of Strain at (1,350° C.-100 MPa) (1/sec) |
| Example 11 | 200 | 320 | 180 | 300 | 3 × 10$^{-7}$ |
| Example 12 | 250 | 450 | 200 | 400 | 2 × 10$^{-8}$ |
| Comparative Example 8 | 200 | 320 | 180 | 200 | 4 × 10$^{-5}$ |

As is apparent from Table 4, in particular, in the composites of Examples 11 and 12 prepared by using a fine SiC powder and a carbon powder, decreases in strength in a high-temperature range are smaller than that of the composite of Comparative Example 8 prepared by using a fran resin serving as coarse carbon source, and creep characteristics are considerably improved. For this reason, high-temperature resistance is excellent.

EXAMPLE 13

The same manufacturing process as in Example 1 was repeated except that Si—Mo—Ta alloy was used in place of Si—Mo alloy to be impregnated during reaction-sintering, thereby preparing a ceramic matrix composite according to Example 13.

Afore-mentioned Si—Mo—Ta alloy was prepared as a metal mixture obtained such that 10 mol % of Mo powder with respect to an Si powder content and 10 mol % of Ta powder with respect to a Mo powder content were mixed with an Si powder by a wet method.

The preliminary green body was heated to a temperature of 1,450 to 1,600° C., and reaction-sintering was performed while an Si—Mo—Ta alloy formed by melting the metal mixture was impregnated in the green body, thereby preparing a ceramic matrix composite according to Example 13.

EXAMPLE 14

The same manufacturing process as in Example 1 was repeated except that Si—Mo—Ti alloy was used in place of Si—Mo alloy to be impregnated during reaction-sintering, thereby preparing a ceramic matrix composite according to Example 14.

Afore-mentioned Si—Mo—Ti alloy was prepared as a metal mixture obtained such that 10 mol % of Mo powder with respect to an Si powder content and 10 mol % of Ti powder with respect to a Mo powder content were mixed with an Si powder by a wet method.

The preliminary green body was heated to a temperature of 1,450 to 1,600° C., and reaction-sintering was performed while an Si—Mo—Ti alloy formed by melting the metal mixture was impregnated in the green body, thereby preparing a ceramic matrix composite according to Example 14.

With respect to thus prepared composites of Examples 13 and 14, three-point bending strength test at room temperature (RT: 25° C.) and 1,600°0 C. and oxidation test were performed. The measurement results are shown in Table 5 described below.

Si—Mo alloy to be impregnated during reaction-sintering, thereby preparing a ceramic matrix composite according to Example 15.

Afore-mentioned Si—Mo—Al alloy was prepared as a metal mixture obtained such that 10 mol % of Mo powder with respect to an Si powder content and 10 mol % of Al powder with respect to a Mo powder content were mixed with an Si powder by a wet method.

The preliminary green body was heated to a temperature of 1,450 to 1,600° C., and reaction-sintering was performed while an Si—Mo—Al alloy formed by melting the metal mixture was impregnated in the green body, thereby preparing a ceramic matrix composite according to Example 15.

EXAMPLE 16

The same manufacturing process as in Example 1 was repeated except that Si—Mo—Cr alloy was used in place of Si—Mo alloy to be impregnated during reaction-sintering, thereby preparing a ceramic matrix composite according to Example 16.

Afore-mentioned Si—Mo—Cr alloy was prepared as a metal mixture obtained such that 10 mol % of Mo powder with respect to an Si powder content and 10 mol % of Cr powder with respect to a Mo powder content were mixed with an Si powder by a wet method.

The preliminary green body was heated to a temperature of 1,450 to 1,600° C., and reaction-sintering was performed while an Si—Mo—Cr alloy formed by melting the metal

TABLE 5

| Sample No. | Reinforcements | | Matrix of Composite (vol. %) | | | Thickness of Surface Layer Containing $Si_3N_4$ ($\mu$m) | Density Ratio of Matrix (%) |
|---|---|---|---|---|---|---|---|
| | Specification | Volume Fraction Vf (%) | SiC | Molybdenum Silicide Based Compound | Free Si | | |
| Example 13 | BN-coated SiC continuous fiber (Hi-Nicalon) | 25 | 79 | (Mo, Ta)Si$_2$ 12 | 8 | — | 99 |
| Example 14 | BN-coated SiC continuous fiber (Hi-Nicalon) | 25 | 80 | (Mo, Ti)Si$_2$ 12 | 8 | — | 99 |
| Comparative Example 1 | BN-costed SiC continuous fiber (Hi-Nicalon) | 25 | 81 | — | 19 | — | 88 |

| | Three-Point Bending Strength (MPa) | | | | Oxidation Resistance |
|---|---|---|---|---|---|
| | Room Temperature (RT) | | (1600° C.) | | |
| | Initial Matrix Cracking Strength of (F) | Maximum Strength of (U) | Initial Matrix Cracking Strength of (F) | Maximum Strength of (U) | Weight Increase Rate of Sample After Oxidation Test |
| Example 13 | 200 | 330 | 190 | 320 | 0.3 |
| Example 14 | 230 | 350 | 180 | 300 | 0.3 |
| Comparative Example 1 | 250 | 420 | 50 | 75 | 1 (reference value) |

As is apparent from the results shown in Table 5, the respective composites of Examples 13 and 14 are more excellent in high-temperature strength and oxidation resistance in comparison with that of Comparative Example 1.

EXAMPLE 15

The same manufacturing process as in Example 1 was repeated except that Si—Mo—Al alloy was used in place of mixture was impregnated in the green body, thereby preparing a ceramic matrix composite according to Example 16.

With respect to thus prepared composites of Examples 15 and 16, three-point bending strength test at room temperature (RT: 25° C.) and 1,600° C. and creep test were performed. The measurement results are shown in Table 6 described below.

TABLE 7

| | Three-Point Bending Strength σ (MPa) | | | | High-Temperature |
|---|---|---|---|---|---|
| | Room Temperature (RT) | | 1600σ | | Creep Test |
| Sample No. | Initial Matrix Cracking Strength of (F.) | Maximum Strength of (U) | Initial Matrix Cracking Strength of (F.) | Maximum Strength of (U) | Rate of Strain at (1,350° C.-100 MPa) (1/sec) |
| Example 15 | 250 | 360 | 180 | 320 | $2 \times 10^{-8}$ |
| Example 16 | 200 | 350 | 170 | 300 | $6 \times 10^{-8}$ |
| Comparative Example 8 | 200 | 320 | 180 | 200 | $4 \times 10^{-5}$ |

As is apparent from the results shown in Table 6, the respective composites of Examples 15 and 16 are more excellent in high-temperature strength and creep characteristics in comparison with that of Comparative Example 8.

As has been described above, in a ceramic matrix composite according to the present invention and a method of manufacturing the same, since a part or all of free Si contained in matrix SiC is substituted for molybdenum silicide based compound such as molybdenum disilicate ($MoSi_2$) having excellent oxidation resistance, a ceramic matrix composite having excellent high-temperature characteristics can be obtained.

When a dense surface layer containing silicon nitride ($Si_3N_4$) is formed on the surface of a ceramic matrix fiber composite material, a corrosive gas or an oxidizing gas is rarely permeated in the composite material even if the ceramic matrix composite is used in a corrosive environment. Therefore, a ceramic matrix composite having excellent environment resistance can be obtained.

What is claimed is:

1. A silicon carbide ceramic matrix composite comprising:
a silicon carbide ceramic matrix and reinforcements dispersed within said silicon carbide matrix, wherein said silicon carbide matrix has a relative density of not less than 90% and comprising molybdenum suicide compound clusters containing particles consisting of silicon carbide.

2. The ceramic matrix composite according to claim 1, wherein said ceramic matrix consists essentially of silicon carbide, a molybdenum silicide compound and elemental silicon, and said ceramic matrix has a relative density of not less than 98% and an elemental silicon content of not more than 10% by volume.

3. The ceramic matrix composite according to claim 1, wherein said molybdenum silicide compound comprises molybdenum disilicide ($MoSi_2$).

4. The ceramic matrix composite according to claim 1, wherein said molybdenum silicide compound is expressed by the general formula Mo—Si—X where X is at least one element selected from the group consisting of Al, Ta, Ti, Zr, Y, Re, W, V, Cr and Nb.

5. The ceramic matrix composite according to claim 1, wherein said composite further comprises a surface layer comprising silicon carbide, a molybdenum silicide compound and silicon nitride, and wherein said surface layer is formed on a surface of the ceramic matrix composite.

6. The ceramic matrix composite according to claim 1, wherein said composite material further comprises a nitride surface layer comprising silicon nitride, and wherein said nitride surface layer is formed on a surface of the ceramic matrix composite.

7. The ceramic matrix composite according to claim 5, wherein said surface layer has a thickness of not less than 10 μm, and the thickness of said surface layer is not more than 5% of the thickness of the ceramic matrix composite.

8. The ceramic matrix composite according to claim 6, wherein said silicon nitride contained in the surface layer has an average grain size of not more than 10 μm.

9. The ceramic matrix composite according to claim 1, wherein said reinforcements comprise ceramic continuous fibers.

10. The ceramic matrix composite according to claim 1, wherein said silicon carbide has an average grain size of not more than 20 μm, and said molybdenum silicide compound has an average grain size of not more than 10 μm.

11. The ceramic matrix composite according to claim 1, wherein each of said clusters has a diameter of not more than 200 μm.

12. The ceramic matrix composite according to claim 1, wherein said particles consisting of silicon carbide dispersed in the molybdenum silicide compound are within the nanometer size range.

* * * * *

UNITED STATES PATENT AND TRADEMARK OFFICE
CERTIFICATE OF CORRECTION

PATENT NO. : 5,990,025
DATED : November 23, 1999
INVENTOR(S) : Shoko Suyama, et. al.

It is certified that error appears in the above-identified patent and that said Letters Patent is hereby corrected as shown below:

Claim 1, column 19, line 41, "suicide" should read --silicide--.

Signed and Sealed this

First Day of May, 2001

Attest:

NICHOLAS P. GODICI

*Attesting Officer*     *Acting Director of the United States Patent and Trademark Office*